April 5, 1966  J. W. COFFMAN  3,244,388
INSULATED PIPE HANGER CONSTRUCTION
Filed Jan. 20, 1964
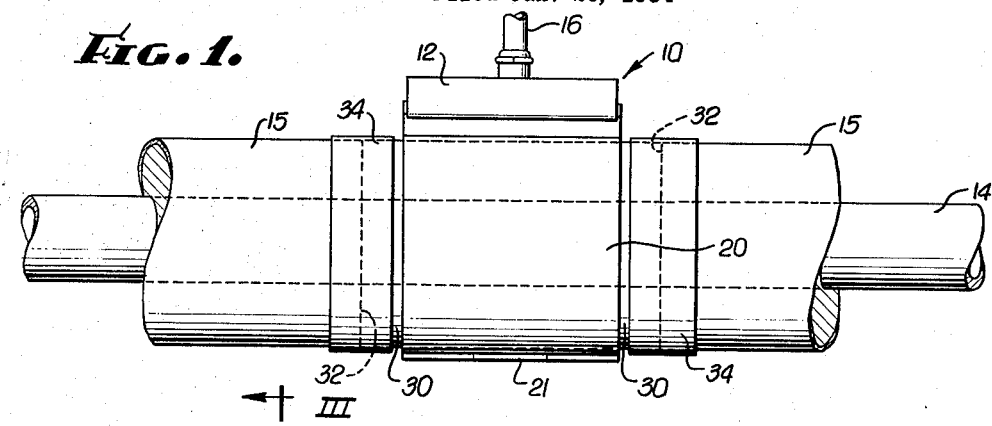
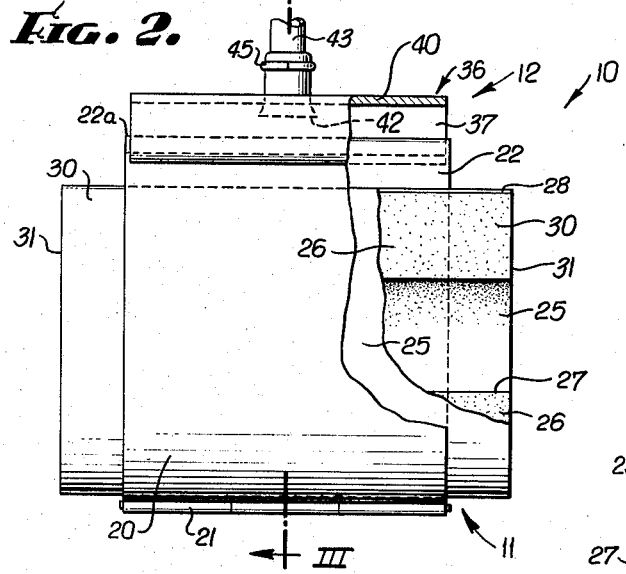
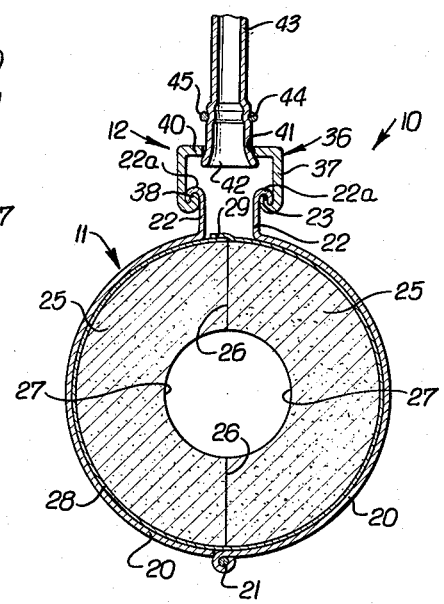
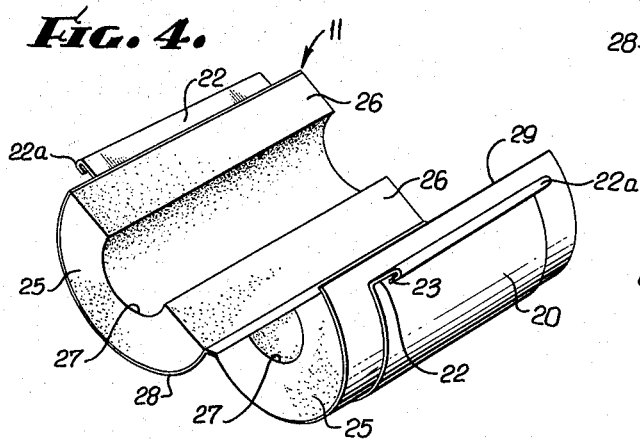
JACK W. COFFMAN
INVENTOR.
BY Miketta & Glenny
ATTORNEYS.

United States Patent Office 3,244,388
Patented Apr. 5, 1966

3,244,388
INSULATED PIPE HANGER CONSTRUCTION
Jack W. Coffman, 10336 Dorothy Ave.,
South Gate, Calif.
Filed Jan. 20, 1964, Ser. No. 339,025
2 Claims. (Cl. 248—62)

This invention relates to an insulated pipe hanger construction and method of installing insulated pipe coverings and more particularly to a pipe hanger adapted to facilitate assembly of the hanger with a pipe to be insulated and to avoid crushing or partial destruction of insulation at a pipe hanger support.

In pipe lines conducting fluids of low temperature range such as refrigeration lines, ice water, chilled water, and the like, without insulation or vapor barrier coverings, a condition know as "sweating" of the pipe often occurs because of condensation of ambient moisture on a cool pipe surface. Such sweating can cause rusting of pipes and hanger supports, and may also cause possible damage to adjacent materials; for example, goods or products stored beneath such a sweating pipe. When such pipe lines were previously protected against this condition by coverings having insulation and vapor barrier characteristics, prior proposed hanger constructions generally were difficult to assemble with the insulated covering for the pipe lengths between pipe hanger supports. Installers of such pipe insulation were often required to first hang the pipe from a pipe support without insulation, insulate the pipe up to a hanger support, remove the support or shift the support while placing insulation at the section of the pipe at which the pipe support would be engaged, and in some instances shift the pipe longitudinally and thereby disturb adjacent hanger assemblies which had been completed and sealed. Such disturbance of completed sealed pipe hanger support arrangements often destroyed or weakened previously made vapor seals. With a weakened vapor seal and partial crushing of insulation material caused by such shifting, a sweating condition at that point would later occur, causing rusting and deterioration of the pipe and the pipe hanger.

Moreover, such prior hanger constructions were usually made of narrow metal bands which resulted in large stress concentrations on the pipe and ultimately produced crushing of the insulation and sometimes producing a bend of the pipe at the hanger support. Such insulation crushing also destroyed the vapor seal at that point.

This invention contemplates a pipe hanger construction which has numerous advantages over prior proposed pipe hanger constructions known to me, and provides a more uniform distribution of pipe load forces so as to eliminate and prevent bending of the pipe and consequent destruction of insulating and vapor barrier material at and adjacent to the hanger. The hanger construction of this invention is so designed that installation is facilitated of a pipe line with insulation or vapor barrier material, that is, less time is required for installation, less disturbance of completed sections is provided, and there is greater assurance of a vapor sealed pipe line.

The primary object of the present invention is to provide and disclose a novel pipe hanger construction readily installed and employed in the support of insulated pipe lines.

An object of this invention is to disclose and provide an insulated pipe hanger construction which provides a virtually fool proof vapor seal adjacent pipe hanger supports.

Another object of this invention is to disclose and provide an insulated pipe hanger construction which does not require longitudinal shifting of a pipe line while the line is being covered with insulating material.

Another object of the invention is to disclose and provide an insulated pipe hanger construction consisting essentially of two parts, which permits convenient and ready assembly with a pipe line, and which substantially eliminates the possibility of inadvertent crushing of insulation and vapor barrier materials while the pipe hanger construction is installed.

Generally speaking, the present invention contemplates a pipe hanger construction having a hinged split section hanger body means provided with lock portions and having insulating and vapor barrier material carried thereby and bonded thereto so that the body means may be handled virtually as a unit. Lock or retainer means are slidably engageable with the lock portions on the hanger body means for firmly tightly clamping and holding the hanger body means in clamped relation about a pipe and with a vapor seal perfected at and adjacent to the pipe hanger support.

Many other objects and advantages of the present invention will be readily apparent from the following description of the drawings in which an exemplary embodiment of the present invention is shown.

In the drawings:
FIG. 1 is a side elevational view of a pipe hanger construction embodying the present invention.
FIG. 2 is an enlarged elevational view of the pipe hanger shown in FIG. 1.
FIG. 3 is a transverse sectional view taken in the plane indicated by line III—III of FIG. 2; and
FIG. 4 is a perspective view of the hinged hanger body member of this invention in open position.

In the example of this invention shown in FIG. 1, pipe hanger means generally indicated at 10 comprises a pipe hanger body means 11 (FIG. 4) and a lock or retainer means 12. As generally shown in FIG. 1, a pipe line 14 for conveying any type of fluid may be covered by insulation covering or material 15 on both sides of a pipe hanger 10. The insulation covering 15 normally tightly grasps pipe 14 and is so installed as to form a vapor barrier about the length of pipe enclosed by the insulation material. The lock means 12 includes a pipe hanger support bolt 16 which may be supported from a suitable support beam or member at predetermined intervals depending upon the weight of the pipe to be supported. The manner in which the bolt 16 is connected to the support member is well known and is not described in this application.

Pipe hanger body means 11 comprises a pair of semi-cylindrical clamp-like hanger body members 20 preformed from suitable metal and generally are rigid and nonflexible. The hanger body members 20 are provided with a suitable hinge connection 21 to permit opening of the body members so that a pipe may be received therebetween and to then permit closing of said body members about and encircling a pipe. The metal body members 20 are preformed to a selected radius and the width of said body members is preferably at least equivalent to the diameter of the body members so that a section or length of pipe equivalent thereto will be supported by the rigid body members. A large bearing or support area for the pipe is thereby afforded.

The body members 20 include spaced parallel outwardly extending flanges or marginal walls 22 having outwardly directed return longitudinal edge portions 22a defining longitudinal parallel grooves 23. Flanges 22 and grooves 23 engage lock means 12 as later described.

A pair of insulating block sections of semi-cylindrical form are carried within body members 20. Each section 25 is fitted within a corresponding body member 20 and has end faces 26 which are urged into pressure abutment with the adjacent face 26 when the pipe hanger body member is in closed locked position. The sections 25 include longitudinally extending recesses 27 of semi-circular form. The recesses 27 provide space for reception of pipe 14 in tight frictional engagement. The outer circumferential surface of each section 25 may be covered with a sheet 28 of vapor barrier or moisture proof material such as a multiply laminated reinforced paper having one or more plys impregnated with moisture resistant material such as asphalt, bitumen, and the like. The sheet 28 on at least one section 25 is provided with a longitudinally extending free margin 29 adapted to overlie and to be sealed against the adjacent sheet 28 on the adjacent section 27 between the flanges 21 when the body members are in closed position. Thus, there is afforded a longitudinal seal for the length of the pipe hanger 10.

The vapor barrier sheet 28 may be adhesively bonded to the internal faces of the body members 20 so that the sections 25 and body members 20 may be handled and used as a unit.

The insulating sections 25 may be made of suitable insulation material having the characteristics of being impervious to acids and acid fumes, incombustible, inorganic, a very minimum of water absorption, and having a selected thermal conductivity and diffusivity. Such a material is commercially known as "Foamglas" made by Pittsburgh Corning. Such an insulating material may conform to federal specifications insulation block and pipe covering, thermal cellular glass, hh–i–551 or revisions thereof.

The insulating sections 25 extend beyond opposite edges of the hanger body members 20 to form end abutment portions 30 having flat transverse edge faces 31 adapted to abut end faces 32 of the adjacent insulating material 15 which may be of the same material as that described above. The end abutment portions 30 provide a circumferential surface for engagement by a joint sealing tape 34 of selected width and of a material similar to the water and moisture impervious vapor barrier sheet 28. The tape 34 thus seals the joint between the end abutment portions 30 and the adjacent face 32 of the adjacent insulation material.

It will be understood that when the lap 29 is sealed to the vapor barrier sheet 28 and when the tapes 34 are sealed to the insulation material so as to cover the joints at 32 a suitable barrier lap cement may be employed so that the joint and the sections 25 will be completely and effectively sealed against ambient moisture so as to prevent any condensation forming on pipe 14 at such localized areas.

The lock, clamp, or retainer means 12 may comprise a channel section clamp or lock member 36 having a length approximately that of the width of body members 20. Clamp member 36 includes channel walls 37 terminating in longitudinally extending parallel upwardly directed lock ribs or edge portions 38. The lock ribs 38 may be slidably received within the longitudinal grooves 23 on the body members 20 when such body members are pressed tightly inwardly so that the flanges 22 may be spaced close enough to permit such reception of the locking ribs in such grooves. The locking ribs 38 and the grooves 23 thus cooperate to interlock and to interengage the locking member 36 with the body members 20 and to tightly retain the pipe hanger 10 in assembly.

The channel section lock member 36 includes a transverse wall 40 which may be provided with a central port 41 in which may receive a downwardly and outwardly flared end 42 of a pipe hanger support bolt 43. The flared end 42 provides a simple swivel connection with the lock member 36. The end 42 of bolt 43 may also be provided with an annular recess 44 to receive a lock ring 45 which limits downward movement of bolt 43 with respect to transverse wall 40. The upper end (not shown) of bolt 43 may be connected in well known manner to a suitable support beam or member.

When using the pipe hanger 10 described above the hanger body means 11 may be opened to a position as shown in FIG. 4, and then placed about in encircling fashion pipe 14 beneath a support point or member to which bolt 43 is to be connected. The clamp means 12 may be moved to one end of the hanger body members 20 and then slidably moved longitudinally to interengage the lock ribs 38 with the grooves 23 until the lock member 36 is positioned as shown in FIGS. 1 and 2. The bolt 16 may then be connected to the support member. In such position it will be noticed that pipe 14 is held by pipe hanger at the selected level and that such level will not change except by adjustment of the support bolt 43. As the installer applies the split type insulation 15 about pipe 14, he reaches a pipe hanger 10 and cuts a last length of insulation material 15 to a measured length so that the end face 32 thereof will closely abut the end face 31 of the insulator sections 25. If necessary, the body means 11 may be urged longitudinally so that the abutment against faces 31 and 32 may be a pressure abutment. The tape 34 may then be applied to the joint. As the installer proceeds with installation of split insulation material 15 on the opposite side of the hanger, he may easily force the additional material 15 against the opposed end face of the sections 25 so that a tight abutting contact is made. The other tape 34 may then be applied and the pipe hanger joints beneath tapes 34 are sealed against humidity and moisture.

It should be noted that during such installation there is no moving of pipe 14 out of its predetermined level and thus previously made joints and pipe supports at pipe hanger supports are not disturbed. Moreover, it is important to note that the width of body members 20 provide substantial bearing surface or area so that crushing of the insulation material of sections 25 will be avoided because the unit pressure load on the insulation material is reduced. In addition, it should be noted that since the lock member 36 is extended for almost the entire length of the body members 20, there will be very little or no twisting of the body members 20 with respect to the axis of pipe 14, and thus there will be little relative displacement between the pipe 14, the insulator sections 25, and the body members 20 and lock member 36. Any slight relative movement may be accommodated by the swivel section at 42.

It will be understood that the lock member 36 and the body members 20 may be painted in any suitable colors and coded so that ready identification of the pipe line 14 may be made. The clamp member may be provided with arrows to indicate the direction of flow of fluid in pipe 14.

When the insulator sections 25 are bonded to the body members 20, it will be understood that suitable waterproof, moisture resistant adhesives or bonding agents may be employed. A suitable adhesive bonding agent may be one of the epoxy adhesives furnished commercially, and which provides bonding of sections 25 to the body members, so that they may be readily handled as a unit.

While the present invention has been described with respect to a pipe hanger 10 adapted to be supported from a pipe hanger support bolt such as 43, it will be understood that the pipe hanger construction of the present invention is readily adapted for use on roller supports for pipe in which brackets may be provided at bottom sides of the pipe hanger for contact therewith in spaced relation to the hinge connection thereof at 21. In other embodiments, the hanger support bolt 43 may be insulated with insulating material such as rubber grommets provided between the end 42 and the internal surface of the transverse wall 40.

Those skilled in the art will understand that the pipe hanger 10 described above will not only provide a moisture proof support, but will also provide a support for pipe which will resist vibration of such pipe due to changing fluid pressures therein, as for example water hammer.

It will also be understood that while the invention has been described in specific relation to the prevention of condensation on pipe such as 14, the pipe hanger device of the present invention may be employed with pipes which conduct steam and other hot materials and fluids.

Other modifications and changes may be made in the pipe hanger device described above and which come within the spirit of this invention and all such changes and modifications coming within the scope of the appended claims are embraced thereby.

I claim:

1. A unitary insulated pipe hanger construction for use with pipe having insulated covering comprising in combination: a pipe encircling hanger body means comprising a pair of semi-cylindrical clamp-like hanger body members hinged together and having a selected width, said hanger members having spaced parallel opposed longitudinal marginal walls with outwardly directed return edge portions providing longitudinally extending downwardly facing grooves; a pair of semi-cylindrical insulating block sections, each secured to the internal face of one of the hanger body members, said insulating sections extending beyond said hanger body members and providing end abutting portions for cooperative end face engagement with adjacent pipe insulated coverings, said insulated block sections including a vapor barrier means, said end abutting portions being adapted to each partially sealingly support a joint sealing tape; and lock means for said hanger body members including parallel lock ribs slidably received in said grooves and interengaging with said return edge portions for tightly retaining said insulating sections in sealing abutment about a pipe.

2. An insulated pipe hanger assembly adapted to be handled as a unit and facilitating installation of insulation covered pipe, the combination of: preformed rigid block sections of insulation material having a selected length and adapted to encircle a pipe to be covered beneath a suspension point for said pipe; a hinged split section hanger body means having a width less than the length of said block sections and substantially encircling said block sections, said hanger body means including parallel lock portions extending the width of said body means, and a lock member longitudinally slidably engageable with said lock portions to hold said insulation block sections in assembly above a pipe, said lock member having a connection to a pipe hanger support member; said block sections providing joint faces in longitudinal spaced relation to said hanger body means, said lock member having engagement with said lock portions for approximately the width of said body means for limiting twisting between said lock member and said lock portions.

References Cited by the Examiner

UNITED STATES PATENTS

| 1,758,040 | 5/1930 | Hess | 248—62 X |
| 1,825,842 | 10/1931 | Zifferer | 248—62 |
| 2,290,139 | 7/1942 | Buchanan | 248—58 |
| 2,324,181 | 7/1943 | Tulien | 138—149 X |
| 2,405,330 | 8/1946 | Ryder | 138—139 X |
| 2,532,587 | 12/1950 | Williamson | 138—149 |
| 2,545,030 | 3/1951 | Isenberg et al. | 138—149 X |
| 2,919,721 | 1/1960 | Isenberg | 138—149 X |
| 2,979,298 | 4/1961 | Kenyon | 248—62 |
| 3,000,433 | 9/1961 | Kemper | 138—149 X |

FOREIGN PATENTS 230,696   3/1925   Great Britain.

CLAUDE A. LE ROY, *Primary Examiner.*